United States Patent
Kammerl et al.

(10) Patent No.: US 10,393,596 B2
(45) Date of Patent: Aug. 27, 2019

(54) METHOD FOR CALIBRATING AT LEAST ONE PROCESSING ELEMENT

(71) Applicant: KRONES AG, Neutraubling (DE)

(72) Inventors: Martin Kammerl, Regenstauf (DE); Konrad Senn, Alteglofsheim (DE)

(73) Assignee: KRONES AG (DE)

( * ) Notice: Subject to any disclaimer, the term of this patent is extended or adjusted under 35 U.S.C. 154(b) by 177 days.

(21) Appl. No.: 15/549,356

(22) PCT Filed: Feb. 8, 2016

(86) PCT No.: PCT/EP2016/052627
§ 371 (c)(1),
(2) Date: Aug. 7, 2017

(87) PCT Pub. No.: WO2016/124786
PCT Pub. Date: Aug. 11, 2016

(65) Prior Publication Data
US 2018/0024013 A1    Jan. 25, 2018

(30) Foreign Application Priority Data
Feb. 6, 2015  (DE) .................. 10 2015 101 769

(51) Int. Cl.
*G01K 15/00*    (2006.01)
*B29C 49/42*    (2006.01)
*B29C 49/78*    (2006.01)

(52) U.S. Cl.
CPC ............ *G01K 15/005* (2013.01); *B29C 49/42* (2013.01); *B29C 49/786* (2013.01)

(58) Field of Classification Search
CPC ...... G01K 15/005; B29C 49/42; B29C 49/786
(Continued)

(56) References Cited

U.S. PATENT DOCUMENTS

| 6,839,652 B2 * | 1/2005 | Shelby ................ B29C 49/6454 264/535 |
| 8,231,823 B2 | 7/2012 | Humelc et al. ............... 264/489 |

(Continued)

FOREIGN PATENT DOCUMENTS

| DE | 10 2009 047 541 | 6/2011 | ............. B29C 49/68 |
| DE | 10 2010 000 941 | 7/2011 | ............. G01B 21/00 |

(Continued)

OTHER PUBLICATIONS

German Office Action issued in corresponding German Patent Appln. Serial No. 10 2015 101 769.5, dated Sep. 15, 2015, 8 pages.
(Continued)

*Primary Examiner* — Natalie Huls
*Assistant Examiner* — Janice M Soto
(74) *Attorney, Agent, or Firm* — Hayes Soloway P.C.

(57) ABSTRACT

Provided is a method for calibrating at least one processing element, in a processing station for processing plastic preforms, includes providing:
a first measurement preform
establishing at least one first measurement value of the measurement preform before processing by the processing station, and a second measurement value of the measurement preform is measured by the measuring element or a further measuring element before or after processing by the processing station, and using at least these two measurement values, a mathematical temperature curve, is recorded by the measuring element, wherein at least one calibration device determines a deviation of the measured temperature curve from a mathematical standard temperature curve, and eliminates this deviation at least partially by adaptation of processing parameters of the processing station.

13 Claims, 4 Drawing Sheets

(58) Field of Classification Search
USPC .......................................................... 374/1, 2
See application file for complete search history.

(56) References Cited

U.S. PATENT DOCUMENTS

| | | |
|---|---|---|
| 2004/0024560 A1 | 2/2004 | Shelby et al. ................. 702/130 |
| 2009/0272888 A1 | 11/2009 | Nugent et al. .............. 250/252.1 |
| 2011/0175246 A1 | 7/2011 | Winzinger ................... 264/40.1 |
| 2011/0294085 A1 | 12/2011 | Voth et al. ...................... 432/31 |
| 2013/0011807 A1 | 1/2013 | Winzinger et al. ............. 432/43 |
| 2015/0321413 A1* | 11/2015 | Deau ....................... B29C 49/78 700/110 |
| 2016/0325485 A1* | 11/2016 | Gendre ................... B29C 49/78 |

FOREIGN PATENT DOCUMENTS

| | | | | |
|---|---|---|---|---|
| DE | 10 2010 012 445 | 12/2011 | ............. | B29C 49/68 |
| DE | 10 2010 042 759 | 4/2012 | ............. | B29C 45/78 |
| EP | 2 210 731 | 7/2010 | ............. | B29C 49/64 |

OTHER PUBLICATIONS

Search Report and Written Opinion issued in corresponding PCT Patent Appln. Serial No. PCT/EP2016/52627 dated May 11, 2016, with English translation, 14 pages.

International Preliminary Report on Patentability issued in corresponding PCT Patent Appln. Serial No. PCT/EP2016/52627 dated Aug. 8, 2017, 6 pages.

Chinese Office Action (w/translation) issued in application No. 201680008948.9, dated Oct. 31, 2018 (27 pgs).

\* cited by examiner

METHOD FOR CALIBRATING AT LEAST ONE PROCESSING ELEMENT

BACKGROUND OF THE INVENTION

The present invention concerns a method for calibrating at least one processing element, in particular at least one temperature sensor of a processing station, and a corresponding device for calibrating at least one processing element, in particular at least one temperature sensor of a processing station, and a device for heating plastic preforms.

The method described herein comprises a first step in which initially a measurement preform is provided and then, by means of at least one measuring element, at least one first measurement value of the measurement preform is measured before or after its processing by a processing station for processing plastic preforms.

This may mean that, following measurement, the measured value is subjected to an in particular mathematical processing in order to be able to subject the measured values to further detailed analysis.

The measured value may be a pressure value, a temperature value, a force value, a moment value, a position value, a time duration, a flow quantity, a format value, a speed value, a radiation value (e.g. microwave radiation), in particular a radiation intensity value, and/or a germ count. In other words, the at least one measuring element may be configured to measure a pressure value, a temperature value, a force value, a moment value, a position value, a time duration, a gas or liquid quantity (e.g. a volume value), a speed, a radiation intensity or field strength, and/or a germ count. The measuring element may in particular comprise several measurement sensors, wherein each of the measurement sensors may determine or measure one or more of the above-mentioned values. In particular, the measuring element may comprise several measurement sensors of the same type.

The format value stands in particular for certain geometrical or chemical values which relate to one or more geometric parameters or a material composition of bottles or preforms to be produced, and which in turn may be assigned to specific format parts, in particular processing units, of the blowing machine, the filling machine and/or the labelling apparatus.

The at least one measurement value may in particular correspond to a physical processing parameter of containers (preforms and/or bottles) in a blowing machine, a filling machine (filler) and/or a labelling apparatus.

The measuring element may for example therefore comprise, for temperature measurement, optical and/or electrical temperature sensors which measure, in contact with the measurement preform or also contactlessly, the respective electromagnetic radiation emitted by the measurement preform, in particular heat radiation. Also, the measuring element may comprise a processing and storage unit by means of which the measured temperature values are stored and processed.

However, this publication does not achieve the objective that, in a plant comprising several parallel individual processing stations of the same type, the stations must be calibrated to each other in order to deliver a uniform output.

Individual processing stations, i.e. individual process treatment stations, for example microwave ovens, namely usually form a closed system which can normally perform its process autonomously.

If for example several of these stations are combined into a plant e.g. on circulating conveyors, the temperature sensors of the individual stations must be synchronised with each other to avoid an offset between stations which would then be reflected in the quality of the output. In this context, the term "offset" describes any parameter-dependent and parameter-defined deviation from a standard operating value or standard operating range. Temperature sensors, above all contactless temperature sensors e.g. pyrometers, react very sensitively to changes in the process and their environment. Component tolerances, background radiation, temperature changes on the sensor housing, different emission values, ageing influences and many other influence factors affect the measurement accuracy of the temperature sensors.

In the case of a plurality of stations, these factors may vary in intensity, which can then lead to a greater or lesser measurement inaccuracy in the respective stations.

To this extent, the prior art has been unable to offer a facility for adapting the individual processing stations within a plant, for example for processing plastic preforms, on the basis of a pre-selected standard curve in order to minimise the individual deviations described above from such a common selected standard curve.

SUMMARY OF THE INVENTION

On this basis, the object of the invention is therefore to eliminate the above-mentioned problems and indicate, in a particularly simple, economic and operationally reliable manner, a method by means of which calibration, i.e. adjustment of a processing element to a standard curve, can be performed particularly simply. In particular, the standard curve may be a standard temperature curve.

The present invention makes use amongst others of the concept that, by means of at least one calibration device which determines a deviation of the measured point from a reference point, this deviation is reduced at least partially by adaptation of processing parameters of the processing station. The processing parameters also include any control and/or regulation values for regulating and/or controlling the processing station during the process.

By means of the above-mentioned adaptation of measurement values to standard measurement values via the calibration device described herein, the individual processing parameters of a processing station can be prevented particularly advantageously from deviating undesirably from pre-definable standard values.

According to at least one embodiment of the method described herein for calibrating at least one processing element, in particular at least one temperature sensor, of a processing station for processing plastic preforms, this comprises a first step by means of which initially a measurement preform is provided, wherein by means of at least one measuring element at least one first measurement value of the measurement preform is measured before or after its processing by the processing station, and using this at least one measurement value, an in particular mathematical measurement point is recorded by the measuring element, and wherein at least one calibration device determines a deviation of the measured point from a reference point and reduces this deviation at least partially by adapting processing parameters of the processing station.

According to at least one embodiment, a second measurement value of the measurement preform is measured by the measuring element or a further measuring element before or after processing by the processing station, and using at least these two measurement values, a mathematical measurement curve, in particular a mathematical measurement line, is recorded by the measuring element, wherein at least the calibration device determines a deviation of the measured curve from a mathematical reference curve, and this deviation is reduced at least partially by adaptation of processing parameters of the processing station.

To this extent, one and the same measuring element may measure both the first measurement value and the second measurement value. Alternatively however, the first measurement value and the second measurement value may be measured by two or more different measuring elements which may also be arranged differently along, inside or outside the processing station.

If the measurement preform is heated for example during processing through and inside the processing station, the second measurement value is a temperature value which corresponds to a heated measurement preform, wherein the first measurement value thus corresponds to a temperature value at which the measurement preform is still at room temperature (cold).

Furthermore, according to the claimed method, using at least these two measurement values, a mathematical measurement curve, in particular a mathematical measurement line, is recorded by the measuring element or the further measuring element. In other words, therefore the processing unit of the measuring element may be one which, from the two measurement values or several measurement values, for example by means of a mathematical iteration algorithm, establishes a curve along and/or through these two measurement values.

The term "mathematical measurement curve" designates an in particular two-dimensional, preferably constant curve which is produced using at least two measured values, e.g. by means of a numerical calculation method, by means of at least one measuring element and/or the calibration device. In other words, the measurement curve may also be drawn through the at least two measured values.

Methods in which the temperature of the plastic preforms is measured during heating of plastic preforms, before, during or after heating, by means of the measuring element are however already known from the prior art. Reference is made for example to EP 2210731 A2 in which the preform temperature is measured either before and/or during and/or after microwave irradiation. In this publication for example, the temperature is measured by means of a pyrometer.

In general therefore, the measured temperature curve may be adapted to the reference (temperature) curve for example as follows (see FIGS. 5A and 5B):

To produce the temperature curve, therefore preferably at least two measurement values are measured, for example by means of a mathematical algorithm, so that a measurement line can be produced through these two measured values, for example by the measuring element and/or calibration device, which is then compared to the reference line (reference (temperature) curve).

In the case of more than two measurement values, a non-linear temperature curve may be determined and a non-linearity in the measurement behaviour corrected. A key element of the present invention however is that the same reference temperature curve is always used for adjustment of all processing stations. The method claimed may therefore be free from direct or indirect comparison between the individual temperature curves of individual processing stations. The only reference line is therefore the reference temperature curve. Alternatively or additionally, this model may therefore evidently also be applied to any of the measurement values, apart from temperature values.

According to at least one embodiment of the method, at least one first measurement value and/or at least one second measurement value are each measured at least at two processing stations, wherein the resulting measurement curves are adapted to the reference curve by means of the calibration device.

It is conceivable that a reference curve is already stored in the measuring element for this and hence, for calibration, only the two measurement values need to be measured by the measuring element.

For this, the first measurement value may be measured for example before heating of the measurement preform inside the processing station, so that this first measured temperature value reflects the temperature of the measurement preform in its cold state.

This measurement preform may now be heated in the processing stations during or after processing inside the individual processing stations, so that the second measured temperature value can be recorded. During or after measurement of the second temperature value, the measurement preform therefore in principle has a higher temperature than before measurement.

Using the respective differences between the measured temperature values, the offset and for example a gradient of the mathematical temperature curve can now be measured and calculated by the measuring element.

After calculating the mathematical temperature curve, this is compared by the measuring element and/or by means of the calibration device with a reference temperature curve, for example already stored in the measuring element and/or calibration device.

The calibration device is a device which is able to adjust individual processing parameters of the processing station such that a deviation, i.e. the offset, of the measured temperature curve from the mathematical standard temperature curve lies at least within a standard deviation range in the limits of production tolerances.

In addition, it is conceivable that for subsequent adaptation, the measurement preform is again brought into the individual processing stations and there the second measurement values are measured as part of a temporally successive control measurement process, so that it can be established whether the offset minimisation by means of the calibration device has been successful. If this has not been successful, the calibration device may perform a further adjustment. This may be performed for example as part of a correction loop so that by repeated retesting, the calibration device is gradually brought towards the reference range, in particular a reference curve.

Whether the measurement preform is returned to the measurement device between the stations for subsequent adaptation, and/or whether the measurement preform is used for all processing stations or whether an individual measurement preform is used specifically for each processing station, and whether a central measuring element integrating the production flow is installed before or after the processing station or accommodated externally in a calibration unit, depends on the respective structure of the station and is hereby also explicitly claimed.

According to at least one embodiment, at least one measuring element is configured in the form of a central measuring device which is arranged outside the processing station, wherein the first measurement value and/or the second measurement value is measured by means of the measuring element. As already mentioned above, therefore the measuring element may for example be accommodated inside a calibration unit and does not therefore move with the processing station. To this extent, a measuring element of the type described reflects a static structure of the measurement device.

According to at least one embodiment, at least one measuring element is installed decentrally inside the processing station, wherein this in particular moves with the processing station, and the first measurement value and/or second measurement value is measured by means of the measuring element.

This constitutes an additional or alternative embodiment in which the measuring element, instead of being housed for example inside a calibration unit, is installed inside a processing station. In other words, the second measurement values are measured for example constantly, during or after processing.

According to at least one embodiment, the reference curve is recorded by means of at least one measuring element, in that at least one first reference value of the measurement preform is measured by the measuring element before or after its processing inside the processing station, and a second reference value of the measurement preform is measured by a further measuring element during or after its processing inside the processing station, wherein using at least these two reference values, the reference curve, in particular the mathematical reference line, is produced by the measuring element.

In other words, therefore, both the reference curve and the measurement curve itself are set and measured separately again before, during and/or after the calibration process.

Here, a "mathematical reference curve" is an in particular two-dimensional, preferably constant curve which is produced from at least two measured standard values, for example by means of a numerical calculation method, by at least one measuring element and/or the calibration device. In other words, the measurement curve may pass through the at least two measured values.

To this extent therefore, in one embodiment, the reference curve is not itself stored permanently e.g. in the measuring element and/or calibration device, but the standard temperature curve is measured, stored and then processed technically separately, preferably specially adapted to the calibration process, before each calibration process.

Therefore it is conceivable in some variants that the two standard measurement values are measured outside the processing station. For this, a suitable measuring element, such as a temperature sensor, may be accommodated outside the processing station, in particular contactlessly but also in contact with the measurement preform.

This measuring element arranged outside each of the processing stations now initially records a first standard measurement value (cold) on the corresponding measurement preform. During this measurement, therefore, the measurement preform is for example at room temperature.

Then this measurement preform is brought successively for example into each processing station, wherein a measurement value, namely the first measurement value, is also recorded here.

The measurement preform is then heated to a predefined temperature and a value (second standard measurement value (warm)) measured in the measuring element arranged outside this processing station or in a further measuring element different from this measuring element.

The then heated measurement preform is thereafter placed in at least one, preferably in all processing elements, and the second measurement value (warm) then measured inside these.

In other words, in such a measurement sequence, initially only the first values (standard measurement value and measurement value) and only afterwards the second values (warm) are measured.

From the respective difference in temperature values, the offset and for example also the gradient of a resulting mathematical measurement curve are determined at each station and compared with the reference curve by the calibration device.

According to at least one embodiment, initially only the first measurement values are measured before processing of the measurement preform, and only thereafter the second measurement values are measured by the measuring element. To this extent, the entire calibration process is initially divided into a first part, during which only the first measurement value and the first reference value are measured, and a second part during which only the second measurement value and second standard measurement value are measured.

According to at least one embodiment, the measurement preform is a preform dummy or a preform which is configured and provided to be expanded into a container.

The preform here is an element which has the form of a preform. A preform dummy may also have the same dimensions as a preform.

In particular, a preform dummy may comprise the same material as a preform. The preform dummy may also correspond to a preform. In particular, the preform dummy may be substantially round. If therefore the measurement preform is a preform dummy, the preform dummy serves as a test body so that in principle, a preform dummy may also differ from a preform in that a preform dummy (test body) is not suitable for being expanded into a container. This may be reflected amongst others in that the preform dummy only partially has the geometrical and material-technical properties of a preform suitable for expansion. Preferably however, the preform dummy and the preform are bodies which emit back and/or reflect heat radiation, in particular in the infrared spectrum range of electromagnetic radiation, onto at least one measuring element, so that heat radiation can be measured particularly simply by the measuring element or the further measuring element.

According to at least one embodiment, at least one reference face is installed in at least one measuring element, which face can be heated by the processing station, wherein the measurement preform can be brought between the reference face and a measurement sensor, in particular a temperature sensor of the measuring element, and wherein a radiation emission and/or reflection spectrum of the reference face at least partially corresponds to a radiation emission spectrum of the measurement preform.

Such a reference face may be installed inside the measuring element or further measuring element if the measuring element and/or further measuring element is installed in a processing station and moves with the plastic preform or preform dummy during a production process. In other words, the movement of the measuring element on a central measuring device, i.e. a centrally arranged measuring element, for example inside a calibration station, may be omitted so that referencing can take place separately in the respective processing stations.

Preferably, therefore, the reference face emits and/or reflects electromagnetic radiation, for example in the infrared range, in a measurement region of the measuring element such that a radiation emission of the reference face can be measured particularly easily by the measuring element when no measuring preform is arranged in or on the measuring element for measurement purposes.

According to at least one embodiment, the processing station or further processing station comprises at least one resonator, inside which the measuring element and/or plastic preforms are heated. Here, the reference face may be installed at least partially or fully inside or outside such a resonator. If the reference face is arranged for example outside the resonator, it is conceivable that the reference face can then move past the resonator. The reference face may here have the same physical and/or material-technical properties as such a reference face which is installed with and/or in the resonator.

According to at least one embodiment, the processing station is a heating station, in particular a microwave oven. Such processing stations are for example already described in publication EP 2210731 A2, so that the entire disclosure content of this publication is also hereby included in full by reference. To this extent, the total disclosure of EP 2210731 A2 also forms part of the disclosure of this application.

In other words, a device is hereby described for processing plastic preforms, within or by means of which the method described above can be implemented.

Furthermore, the present invention concerns a device for calibrating at least one processing element, in particular at least one temperature sensor, of a processing station for processing plastic preforms. It is pointed out that the features described here concerning the method described above are also disclosed for the calibration device described herein, and vice versa.

According to at least one embodiment, the calibration device comprises at least one processing element, in particular at least one temperature sensor, of a processing station for processing plastic preforms and at least one measuring element, wherein at least one first measurement value can be measured by the measuring element before processing of the measurement preform by the processing station, and a second measurement value can be measured by the measuring element or a further measuring element during or after processing by the processing station.

Using at least these two measurement values, a mathematical measurement curve, in particular a mathematical measurement line, is produced by the measuring element, wherein the device comprises at least one calibration device which determines the deviation of the measured curve from the reference curve and reduces this deviation at least partially by adaptation of processing parameters of the processing station.

The present invention furthermore concerns a device for heating plastic preforms by means of electromagnetic radiation, in particular microwave radiation, comprising at least one processing station and at least one calibration device according to claim 12. It is pointed out that the features described herein concerning the method described above and the calibration device described above are also disclosed for the device described herein for processing plastic preforms, and vice versa.

The device now described may comprise at least one microwave heating unit and at least one microwave generator, a microwave conductor and a resonator. The microwave generator may e.g. be a magnetron, a klystron or a gyrotron, wherein the waves may be generated in any suitable fashion. The microwave conductors are preferably hollow conductors, wherein round or rectangular cross-section is particularly preferred. The use of coaxial conductors is not excluded.

The device described here has the same advantageous embodiments and advantages as the method described above.

BRIEF DESCRIPTION OF THE DRAWINGS

The invention is now explained in more detail below with reference to FIGS. 1 to 4.

In the exemplary embodiments and the figures, the same or equivalent components always carry the same reference symbols. The elements depicted here should not be regarded as to scale; rather individual elements may be shown exaggeratedly large for better understanding.

DETAILED DESCRIPTION OF THE INVENTION

Figure 1:
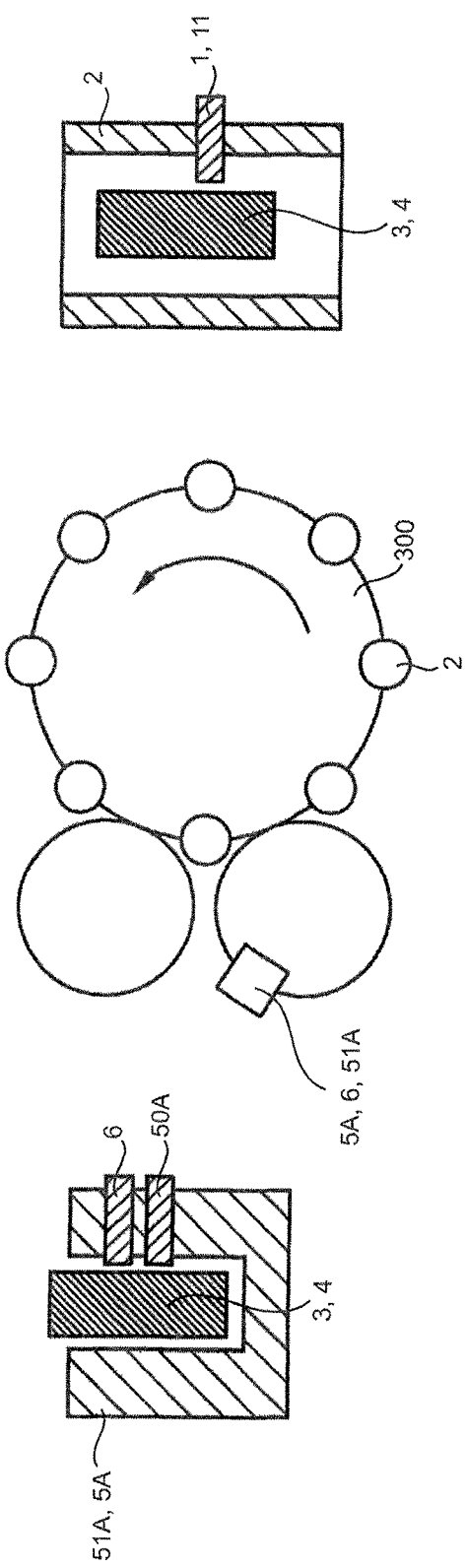
FIGS. 1 to 4 therefore depict individual exemplary embodiments of a device for calibrating processing elements, which is installed inside a device for processing plastic preforms.

FIG. 1 shows, in a diagrammatic depiction inside a central part image, a device 300 described here for processing plastic preforms.

According to a method 100 performed by the device 300 for calibrating at least one processing element 1, in particular at least one temperature sensor 11, of a processing station 2, this method 100 initially comprises a first step in which a measurement preform 4 is provided, wherein by means of a measuring element 5A a first reference point N1 of the measurement preform 4 (in the present case, a plastic preform 3) is measured before it is processed by the processing station 2. In particular, FIG. 1 shows that this measurement is carried out by the measuring element 5A, 51A outside the circulating conveyor on which the processing stations 2 are arranged. A further measuring element 5B, 51B can also be considered for measurement. In the exemplary embodiment according to FIG. 1, therefore, the first measuring element 5A is arranged on an inlet star so that initially the temperature of the still cold measurement preform is measured before input of the measurement preform 4. FIG. 1 therefore depicts a central measurement, so that the measuring element 5A represents a central measuring device.

In a further step, the measuring preform 4 is brought successively to each processing station 2 and here a temperature measurement is performed by means of a temperature sensor 11. This temperature measurement thus gives the first temperature measurement value T1. Since the first measurement takes place in the central measuring device 5A even before the (temperature) processing, the first measurement values T1 and N1 are usually cold. The measurement preform 4 is then heated to a defined temperature and measured again in the measuring element 5A, which gives the second standard temperature measurement value N2. The heated measurement preform 4 is then reintroduced into each of the treatment stations 2, wherein the second temperature measurement value T2 is recorded. From the differences between the temperature values, the offset is now measured by means of the measuring element 5A, whereby a calibration device 6 determines a deviation of a temperature curve T12 produced by the measuring element 5A from a reference (temperature) curve N12 also produced by measuring element 5A, and this deviation is at least partially changed, e.g. eliminated, by adaptation of the processing parameters of the individual processing stations.

Figure 2:
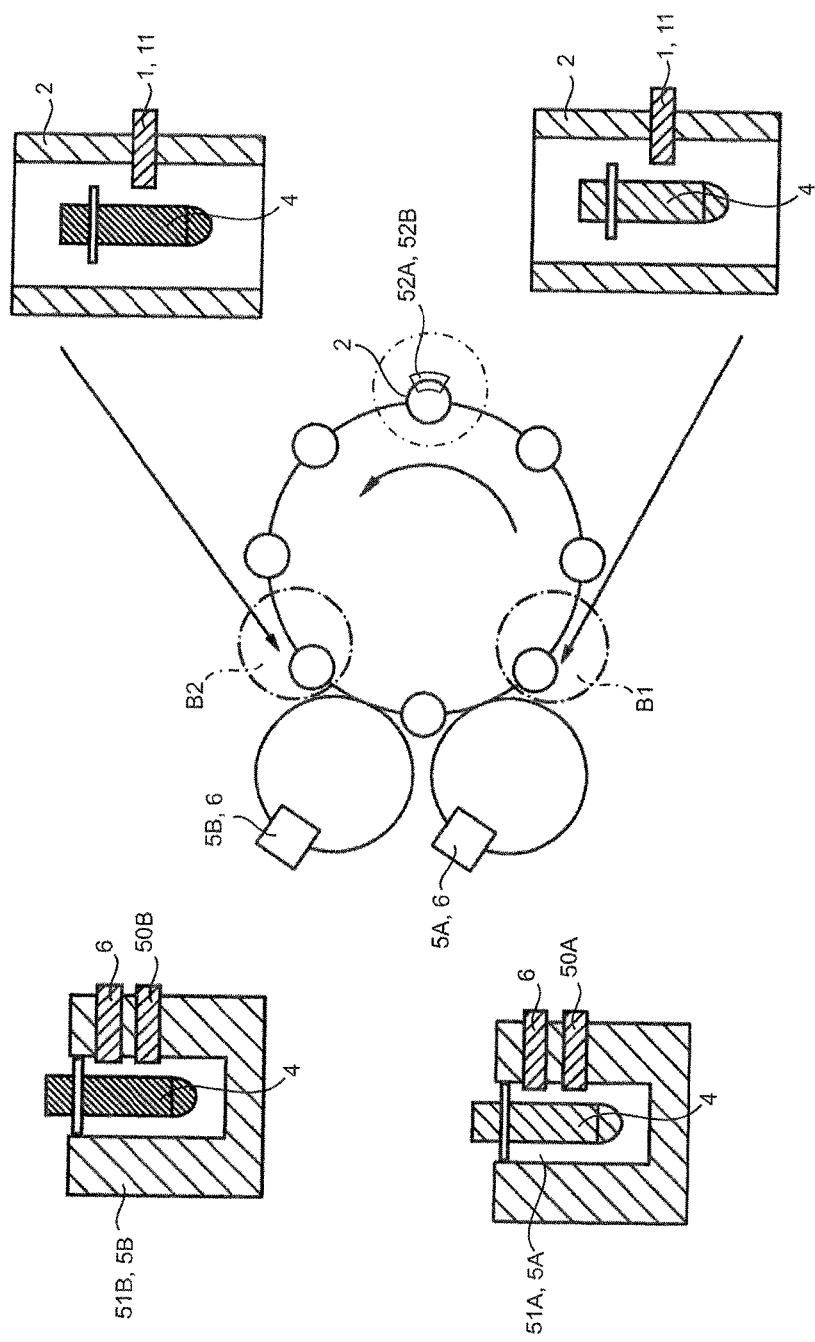

FIG. 2 shows a further exemplary embodiment of a method 100 described herein, in which, in contrast to the exemplary embodiment of FIG. 1, the reference (temperature) measurement values N1, N2 are also measured outside the processing station 2, but in two central measurement devices (=measuring elements) 5A, 51A and 5B, 51B. The still cold measurement preform 4 is initially measured in the central measuring device 5A before introduction into the processing station, so that a first reference (temperature) measurement value N1 can be measured. The measurement preform 4 is then introduced into the processing station 2 and for example the first temperature measurement value T1 is recorded inside a region B1 by means of a heating station installed in the processing station 2, before the start of the heating phase.

After the measurement preform 4 has been heated, the temperature value of the heated measurement preform 4 is then measured inside a region B2, so that the second temperature measurement value T2 is produced. The regions B1 and B2 preferably do not overlap. In particular, the region B1 is exclusively the region inside which no heating has yet taken place. Only after leaving region B1 is the measurement preform 4 heated. Thereafter the product, i.e. the measurement preform 4, is removed from the heating station and the second standard temperature measurement value N2 is recorded in a subsequent further measuring element 5B, which for example is mounted on an outlet star.

From the respective differences, the temperature values and the deviations, i.e. the offset from the standard temperature values, can thus be measured. Also, in each of the exemplary embodiments, a gradient of the temperature curve T12 can also be adapted to a gradient of the standard temperature curve N12. From the respective differences, the offset can be set equally at all stations or the values can be adapted to each other. In the exemplary embodiment 2, this may take place preferably in continuous operation, i.e. during processing of the preform.

FIG. 2 however at the same time describes the case when the measuring elements 5A, 5B are moved with the processing stations 2. The measuring elements 52A, 52B are then decentral. This is indicated in FIG. 2 with a dotted circular line, inside which for example such a decentral measuring element 52A, 52B is moved with the processing element 2 and hence may also be mounted on the processing element 2. It is also conceivable that the movement of each measuring element 52A, 52B can be synchronised via a corresponding control unit with the movement of the processing element 2 assigned to the measuring element 52A, 52B.

Figure 3:
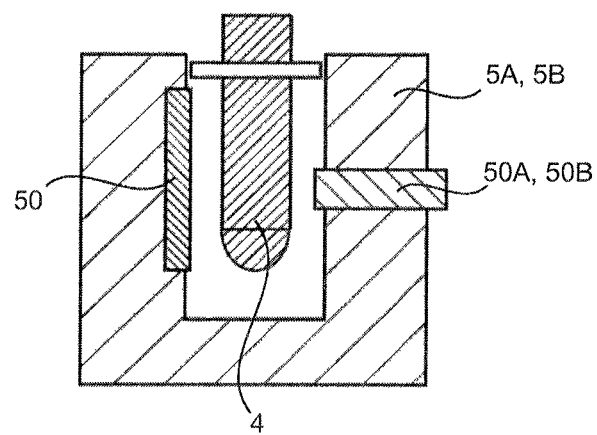

FIG. 3 depicts, in a diagrammatic side view, a more concrete embodiment of the measuring element 5A and/or 5B described here, which may also be installed in the embodiments according to FIGS. 1 and 2. Also, in principle, the reference curve N1 may be recorded by means of the measuring element 5A, 5B; 51A, 51B; 52A, 52B in that the measuring element 5A, 5B; 51A, 51B; 52A, 52B measures at least a first reference value N1 of the measurement preform 4 before or after its processing inside the processing station 2, and a second reference value N2 of the measurement preform 4 is measured before, during or after the processing inside the processing station 2 by a further measuring element 5A, 5B; 51A, 51B; 52A, 52B, and using these at least two reference values N1, N2, the reference curve N12, in particular the mathematical reference line N12, is produced by at least one measuring element 5A, 5B; 51A, 51B; 52A, 52B.

According to FIG. 3, the measuring element 5A, 5B described there has a reference face 50 which is mounted on a holder of the measuring element 5A, 5B for the purposes of calibrating a temperature sensor 50A, 50B. The measuring preform 4 may therefore be introduced into a receiving chamber 60 of the measuring element 5A, 5B such that, when the measuring element 5A, 5B is occupied, the measuring preform 4 is arranged between the reference face 50 and the temperature sensors 50A, 50B.

The embodiment described in FIG. 3 has proved particularly advantageous because absolute measurement precision of all processing stations 2 normally depends on the respective measuring elements 5A, 5B. Namely, if these have a measurement error in relation to offset and/or gradient, there is a danger that this error will be passed on similarly on synchronisation of all processing stations 2.

In order to avoid this error, for example with measuring elements 5A, 5B arranged centrally outside the processing stations 2, the reference face 50 is therefore provided on which a contact temperature measurement can be performed.

When the measurement preform 4 is now brought into measuring element 5A, 5B, the temperature sensor 50A, 50B is oriented towards the reference face 50. Thus a possible measuring error in the temperature sensors 50A, 50B can be detected and corrected. Preferably, therefore, the reference face generally has emission properties which lie at least partially within an emission range which can also be detected by the temperature sensors 50A, 50B.

In order to be able to detect the respective second measurement points (hot) without great measurement error, the reference face 50 may therefore be heated to a similar temperature as for example the measurement preform 4. In particular, it is therefore conceivable that the two temperatures differ by less than 10%, preferably less than 5%. Thus the calibration on the reference face 50 may take place in a temperature range similar to that of the actual temperature measurement.

Figure 4:
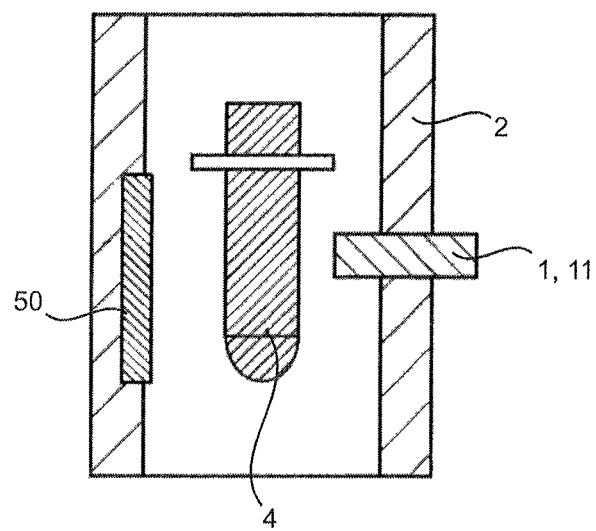
Figure 5A:
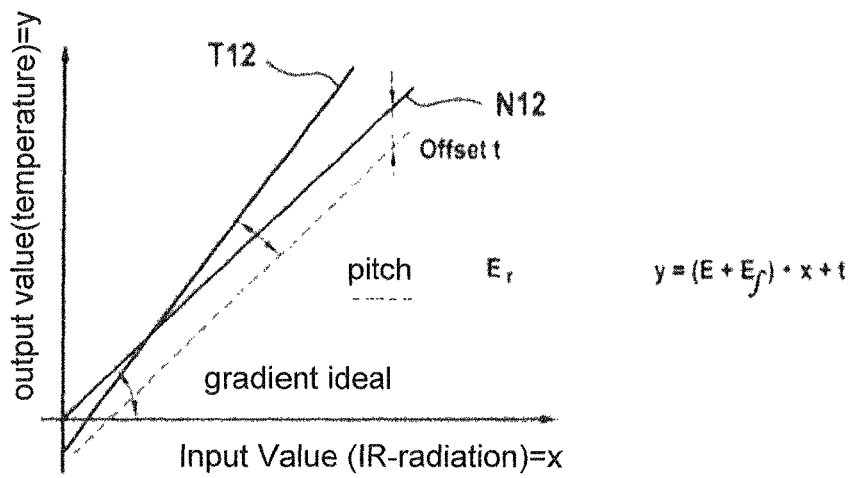
FIGS. 5A and 5B depict a comparison of the measured temperature curve with the reference (temperature) curve.
Figure 5B:
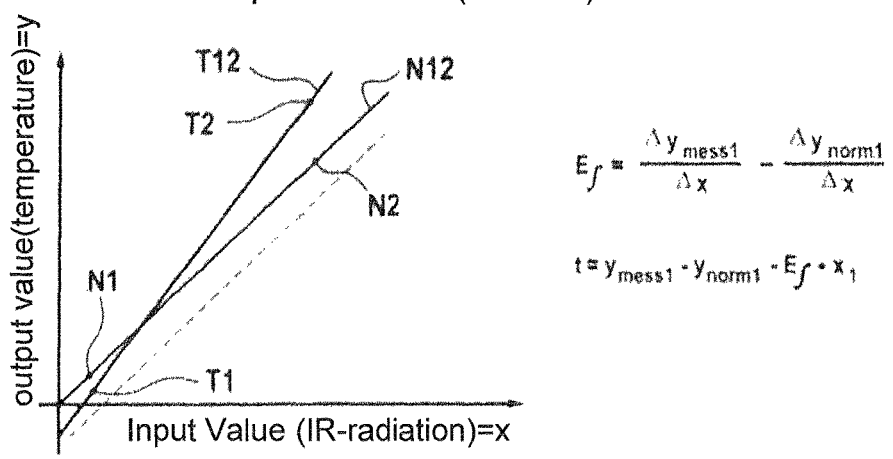

FIG. 4 shows an embodiment of the method 100 described here which is an alternative at least in relation to FIGS. 1 and 2, and in which no reference (temperature) measurement at all is performed centrally outside the processing station 2; instead, such a measurement is performed inside the respective processing stations 2.

Then for example a reference face as described in FIG. 3 may be installed in each of the processing stations, so that this reference face 50 again lies within the measurement range of the temperature sensor if no measurement preform 4 is arranged therein.

Preferably, therefore, at least one processing station comprises a contact temperature sensor and a facility for heating to a maximum process temperature.

By means of the contact temperature sensor, the process temperature sensor can therefore be referenced.

In unheated state, therefore, the first respective measurement point (cold) is determined, wherein in heated state, the second measurement point (hot) is then measured accordingly.

It is conceivable that the referencing may therefore also take place inside the process, if for example the finished product i.e. the measurement preform 4 has been removed and a new one not yet introduced.

Preferably, in such an embodiment, the behaviour of the contact temperature sensors 50A, 50B in the individual processing stations 2 is as similar as possible, in order to be able to perform a homogenous and even temperature measurement.

The invention is not restricted by the description with reference to the exemplary embodiments. Rather, the invention includes every new feature and every combination of features, which includes in particular every combination of features in the claims, even if this feature or this combination itself is not explicitly indicated in the claims or the exemplary embodiments.

LIST OF REFERENCE SYMBOLS

1 Processing element
2 Processing station
3 Plastic preform
4 Measurement preform
5A, 5B Measuring elements
6 Calibration device
50 Reference face
50A, 50B Temperature sensors
11 Temperature sensor
100 Calibration method
200 Calibration device
300 Device for heating plastic preforms
T1, T2 Measurement values
N1, N2 Reference measurement values
T12 Temperature curve
N12 Reference temperature curve

The invention claimed is:

1. A method for calibrating at least one temperature sensor of a processing station for processing plastic preforms, said method comprising:
providing a measurement preform,
establishing a first measurement value of the measurement preform before or after its processing by the processing station, and
subjecting the first measurement value to a mathematical measurement point recorded by a first measuring element,
wherein
at least one calibration device which determines a deviation of the measured point from a reference point, and reduces this deviation at least partially by adaptation of processing parameters of the processing station.

2. The method according to claim 1,
wherein
a second measurement value of the measurement preform is measured by the first measuring element or a second measuring element before or after processing by the processing station, and
using at least these two measurement values, creating a mathematical measurement curve, in particular a mathematical measurement line, is recorded by the first measuring element or the second measuring element,
wherein
at least the calibration device determines a deviation of the measured curve from a mathematical reference curve, and this deviation is reduced at least partially by adaptation of processing parameters of the processing station.

3. The method according to claim 2,
wherein
at least one first measurement value and/or at least one second measurement value are measured at least at two processing stations, and resulting measurement curves are adapted to the reference curve by the calibration device.

4. The method according to claim 2, wherein
initially only the first measurement values are measured by the measuring element before processing of the measurement preform, and only thereafter the second measurement values are measured by the measuring element.

5. The method according to claim 1, wherein
at least one measuring element is configured in the form of a central measurement device which is arranged outside the processing station, wherein the first measurement value and/or a second measurement value are measured by the at least one measuring element.

6. The method according to claim 1, wherein
at least one measuring element is installed decentrally inside the processing station and moved with the processing station, wherein the first measurement value and/or a second measurement value are measured by the at least one measuring element.

7. The method according to claim 1, wherein
a reference curve is recorded by the measuring element, in that the measuring element measures at least one first reference value of the measurement preform before or after its processing inside the processing station, and
a second reference value of the measurement preform is measured by a further measuring element before, during or after processing inside the processing station, and using at least these two reference values, the reference curve, in particular the mathematical reference line, is produced by the at least one measuring element.

8. The method according to claim 1, wherein
the measurement preform is a preform dummy or a preform which is configured and provided to be expanded into a container.

9. The method according to claim 1, wherein
at least one reference face is installed in at least one measuring element and is heated by the processing station, wherein the measurement preform is brought between the reference face and a measurement sensor, in particular a temperature sensor, of the measuring element, and wherein a radiation emission spectrum of the reference face at least partially corresponds to a radiation emission spectrum of the measurement preform.

10. The method according to claim 1, wherein
the processing station is a heating station, in particular a microwave oven.

11. The method according to claim 1, wherein
the processing station or a further processing station comprises at least one resonator, within which the measuring element and/or the plastic preform are heated, wherein a reference face is installed at least partially or fully outside the resonator.

12. A calibration device for calibrating at least one temperature sensor of a processing station for processing plastic preforms, said device comprising:
at least one measuring element configured to provide at least one first measurement value of the preform before or after processing by the processing station;
a processor configured to compare the first measurement value to a mathematical measurement point; and
at least one calibration device configured for determining a deviation of the measured point from a reference point, and reducing the deviation at least partially by adaptation of processing parameters of the processing station.

13. A system for heating plastic preforms using electromagnetic radiation, in particular microwave radiation, comprising at least one processing station, having at least one calibration device as claimed in claim 12.

* * * * *